United States Patent Office 3,649,391
Patented Mar. 14, 1972

3,649,391
PROCESS FOR PRODUCING A MARKING RECEPTIVE SURFACE ON A POLYSTYRENE SUBSTRATE
Albert D. Lewis, 2523 Valleybrook Drive, Toledo, Ohio 43615
No Drawing. Filed May 1, 1970, Ser. No. 33,954
Int. Cl. B44c 1/22; B29d 7/20
U.S. Cl. 156—2                             6 Claims

ABSTRACT OF THE DISCLOSURE

A process for producing a marking receptive surface on a polystyrene substrate which process consists in subjecting the substrate to the action of a solution of dichloromethane, perchloroethylene and heptane for a time sufficient to produce a visible marking surface.

BACKGROUND OF THE INVENTION

The present invention pertains to a novel process for treating the surface of a hydrophobic polymeric material to render the surface receptive to marking legends and the like. More particularly, this invention relates generally to a process for treating the surface of polystyrene with a tertiary organic solution to produce by its solvent, frosting action at least one predetermined selected area of opacity for receiving easily removed, temporary indicia, decorations, writings and the like.

Polystyrene is a crystal-clear, hard, rigid, transparent, thermoplastic resin which emits a characteristic, metallic ring, when dropped to a firm surface. Polystyrene is also essentially free from odor and taste, and, because of its ease of manufacture, its low cost, moldability, low moisture absorption, dimensional stability, electrical insulation properties and chemical resistance, it is widely used for injection molding, vacuum forming, calendering, and blow molding to form items of science and commerce. Polystyrene, because of these excellent properties, has been made into many conventional articles of commerce and science; for example, tubing, test tubes, laboratory beakers, graduated cylinders, pipettes, packaging boxes, pill boxes, ointment jars, cosmetic bottles and the like.

Up to the present time, probably the major troublesome disadvantage of polystyrene for use in the fabrication of articles employed in the scientific, commercial and like fields, is the art known fact that standard markings do not adhere or they do not adhere satisfactorily to the surface of polystyrene. This handicap, that is, the inability of polystyrene to receive on its surface various indicia, trademarks, advertising legends, graduation marks, decorations or other printed or written markings is evidenced by the fact that these markings and the like, if placed on the surface, are easily smeared or rubbed off by normal abrasion and contacts suffered by a polystyrene item during routine shipping, handling and the like. Hence, in order to obtain a satisfactory surface area on a polystyrene item for receiving markings and the like, it is presently necessary to fix costly, expensive adhesive labels to the surface for receiving writings, descriptive matters, and the like. It is obvious that this involves an added expense and necessitates complicated manufacturing procedures to produce the adhesive labels for affixing to the surface of a polystyrene item.

Moreover, the application of labels to reuseable items such as beakers, graduated cylinders and the like, places an added burden on the consumer because he must, on subsequent useage of the item, remove the label and its adhesive from the polystyrene surface prior to the washing and later markings thereon. This procedure, like the manufacture of the labels, adds extra costs in the form of labor and the like to the useage of the polystyrene item. Seemingly, the effect of these combined handicaps as above set forth is to substantially limit the employment of polystyrene items in the scientific and commercial fields.

Accordingly, in view of the above presentation, it is an immediate object of this invention to make available to the art a process for treating a hydrophobic surface to render the surface receptive to markings and the like.

Another object of the present invention is to provide a process for treating the surface of polystyrene to promote, on the surface, areas which will receive marking impressions that will firmly adhere thereto and effectively resist removal upon normal abrasion, yet, can be easily removed by the application of slight manual power.

Yet still a further object of the present invention is to provide a process for treating surfaces of polystyrene with a tertiary, organic solution to produce at least one predetermined, selected area of opacity for receiving easily removed, temporary indicia, decoration, writings and the like.

Still yet a further purpose of the present invention is to treat the surface of polystyrene with a three-component, organic solution to produce, by its solvent frosting of the polystyrene selected area of opacity for receiving eraseable write-on markings.

Other objects, as well as advantages and features of the present invention will become more readily available from the following detailed specification, and the appended claims.

SUMMARY OF THE INVENTION

This invention is concerned with a novel process for producing selected marking area or predetermined marking spot on a polystyrene substrate. The marking area or spot is provided by intimately contacting the polystyrene substrate with a three-component solution consisting essentially of methylene chloride, perchloroethylene, and heptane. By contacting the polystyrene substrate with the three-component solution, a suitable marking area is easily effected and provided for receiving indicia, markings and the like.

DETAILED DESCRIPTION OF THE INVENTION

The present invention provides a method for etching on a polystyrene background of various items of science and commerce a selected marking area; for example, on the bottom of culture dishes, on the side of graduated cylinders and similar apparatus, to promote thereon viewing or write-on areas, or to provide surface areas for receiving identification, trade-marking, etc. The etching action is variable from slight to opaque, depending on the process treatment time. The process treatment time is related to the length of time an etching solution remains in intimate contact with a polystyrene background. In carrying out the invention, a three-component solution consisting of methylene chloride (also known as methylene dichloride or dichloromethane), tetrachloroethylene (also art known as perchloroethylene) and heptane (also known as dipropylmethane) is intimately contacted to a predetermined polystyrene substrate to produce on the substrate an area of opacity of a geometric design or of the whole manufactured item. The three-component etching solution consists essentially of 10% to 15% tetrachloroethylene, 18% to 22% methylene chloride and 65% to 71% of heptane. When the solution is employed for etching according to the spirit of the invention, the percentage thereof will equal 100%, that is, if a lesser amount of one ingredient is used, a corresponding higher amount of another ingredient of the solution is used to produce the solution for treating the substrate. The solution is employed, generally, by immersing a polystyrene item into the solution, by intimately contacting the polystyrene with a felt writing pencil, saturated with the solution, by employing a cotton or felt template to produce a design on the polystyrene substrate and the like. The polystyrene is immersed, or intimately contacted for a time sufficient to produce the desired etched marking area. The etching action of the solution is generally completed in about 1 second to 10 seconds, depending on the thickness of the polystysene substrate and the desired depth of etched area. For most commercial polystyrene items, about 1 second to 5 seconds will suffice to produce an ideal, opaque marking area. The etching action, or etching time, is easily terminated by the evaporation of the solvent, or by washing with an aqueous medium.

The examples immediately below are set forth as embodiments of the invention, and they are not to be considered as limited, as they will be evidence of other embodiments to those skilled in the art from the accompanying specification and claims.

EXAMPLE 1

An etching solution for producing an opaque area on a 4-inch square piece of polystyrene was prepared by intimately mixing 10 milliliters of tetrachloroethylene, 15 milliliters of methylene chloride, and 50 milliliters of normal heptane. The concentration of the solution was 12% tetrachloroethylene, 20% methylene chloride and 68% normal heptane. Next, three, commercially available polystyrene plastic pipettes were treated with the solution by dipping the pipettes into the solution 1, 2, and 3 seconds respectively. The frosted area or etched area appeared on the pipettes after the first, second, with a deeper frosting appearing after the second and third seconds of application of the solution thereto. The etched surface was ideally suited for marking with a pencil or crayon and the markings could be easily erased therefrom.

EXAMPLE 2

In the following example, a methylene chloride, methyl ethyl ketone solution was prepared by mixing 20% of the methylene chloride with 80% of the ketones to make a solution for application to commercially available polystyrene pipettes. The etching property of this solution was very slight when compared with the etching property of the solution set forth in Example 1.

EXAMPLE 3

Another formulation consisting of methylene chloride, tetrachloroethylene and heptane in the ratio of 20% tetrachloroethylene, 33% methylene chloride and 47% normal heptane was mixed together, and applied to polystyrene pipettes. This solution of this percentage concentrate appeared to have a deteriorating effect on the polystyrene and it was seemingly not satisfactory for etching of the pipettes.

EXAMPLE 4

In this example, a felt writing pencil was saturated with a solution consisting of 12% tetrachloroethylene, 20% methylene chloride and 68% normal heptane. The felt writing pencil was then rubbed across some commercially available beakers made of polystyrene and the solution was allowed to remain on the surface for 1, 2, 3, 4 and 5 seconds. In all of these applications, the surfaces of the beakers were next rinsed under tap water to remove the solution and examined macroscopically to ascertain if an opaque or etched surface was produced. The inspection evidenced an ideally suited etched area for receiving markings thereon, and markings applied thereto were easily rubbed off.

EXAMPLE 5

The procedure followed in Example 1 was repeated in this example and all of the experimental conditions were as described in Example 1 except that the etching solution was methylene chloride alone. When the methylene chloride was applied to commercially available, polystyrene pipettes for 1 second, 2 seconds, 3 seconds, 5 seconds, and 10 seconds respectively, it was observed at the end of this time, that the pipettes did not show any apparent etching or opaque-like areas on the surface of the polystyrene pipettes.

It is clear from the above examples that a process has been developed for the application of a composition consisting of methylene chloride, tetrachloroethylene and heptane to polystyrene's surfaces which will not deleteriously affect the surface of the polystyrene nor will it deform or distort the plastic, but it will produce a surface area of sufficient opacity or etched-like qualities that can receive markings and the like. When markings were placed onto the surfaces, they could easily be removed by erasing procedures or by excessive rubbing and the like.

The samples of polystyrene and the pipettes and beakers used for testing the three-component solution of the invention for producing an etched surface on the polystyrene is commercially available polystyrene or commercially available items of polystyrene. It is well known in the art that polystyrene is conventionally manufactured by the polymerization of the unsaturated aromatic monomer, styrene, and that this polymerization proceeds easily under the influence of heat and usually in the presence of a polymerization catalyst. The polymerization of polystyrene is art known and is carried out by the bulk process, a solvent process, the emulsion process, and the suspension process. These procedures are fully described in "Modern Plastic Encyclopedia," vol. 46, No. 10–A, pages 954–955, October 1969; and "Encyclopedia of Chemical Technology," by Kirk-Othmer, vol. 19, pages 55–134, 1969, published by John Wiley & Sons; in "Polymer Technology," by Miles and Briston, Chemical Publishing Company, New York, 1965, pages 179–201; and "Plastic Materials," Brydson, D. Van Nostrand Company, Inc., 1966, pages 247–277.

The invention provides a simple and economic method for treating the surface of polystyrene plastic to produce thereon a receptive area for receiving printing and the like. The invention finds utility for producing markable areas on conventional items of manufacture such as those set forth above. Moreover, since it is obvious in the light of the present disclosure that many changes and modifications can be made in the above-described details without departing from the nature and the spirt of the invention, it is to be understood that the invention is not to be limited thereto, but is to include those embodiments for treating polystyrene, which would be obvious in the light of the present disclosure.

The word "etched," as used herein, is to be construed as used in its classical, conventional meaning; for example, etching to produce a figure or design, on the polystyrene substrate, by lines or strokes, eaten by the chemical solvent into the substrate. The word "frosted," is used in its conventional meaning; that is, etched as with the chemical solvent, to produce a frosted, "electric-lightbulb-like" surface on the polystyrene. The terms "opaque" and "opacity" are also used in a conventional manner to indicate an etched surface, impervious or not reflecting light.

What is claimed is:

1. A process for producing at least one predetermined area of opacity on a polystyrene substrate wherein the process consists essentially of etching the polystyrene substrate by intimately contacting the substrate with an etching solution consisting essentially of 10% to 15% tetrachloroethylene, 18% to 22% methylene chloride and 65% to 71% heptane to produce the desired area of opacity.

2. A process for producing at least one predetermined area of opacity on a polystyrene substrate according to claim 1 wherein the etching solution consists essentially of 12% tetrachloroethylene, 20% methylene chloride and 68% heptane.

3. A process for producing at least one predetermined area of opacity on a polystyrene substrate, according to claim 2 wherein the heptane is normal heptane.

4. A process for producing at least one predetermined area of opacity on a polystyrene substrate according to claim 1 wherein the etching solution is in intimate contact with the substrate for 1 to 10 seconds.

5. A process for producing at least one predetermined area of opacity on a polystyrene substrate according to claim 2 wherein the etching solution is in intimate contact with the substrate for 1 to 3 seconds.

6. A process for producing at least one predetermined area of opacity on a polystyrene substrate according to claim 1 wherein the area of opacity is receptive to marking that can be subsequently removed therefrom.

References Cited

UNITED STATES PATENTS

| | | | |
|---|---|---|---|
| 2,400,720 | 5/1946 | Staudinger et al. | 117—118 |
| 3,091,553 | 5/1963 | Matsumoto | 117—138.8 |
| 3,419,407 | 12/1968 | Riddick | 106—311 |

JACOB H. STEINBERG, Primary Examiner

U.S. Cl. X.R.

156—10; 252—79.4; 117—47 A; 106—311